Patented Apr. 24, 1934

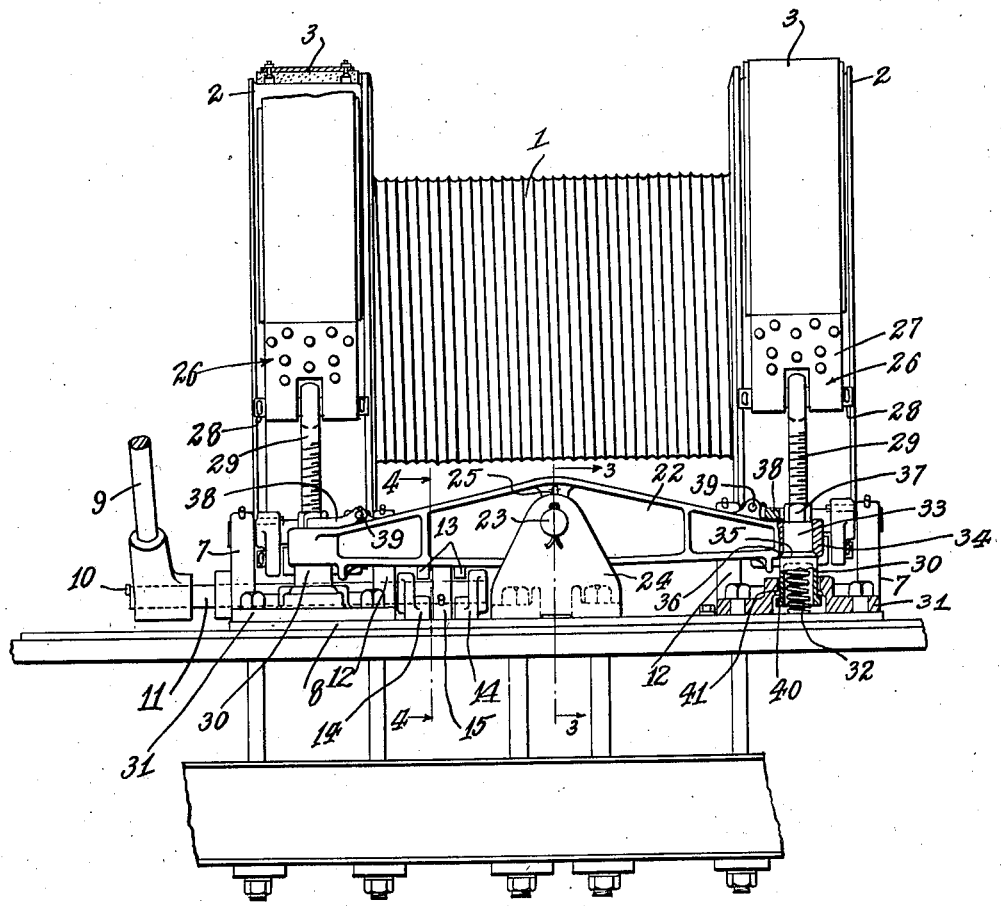

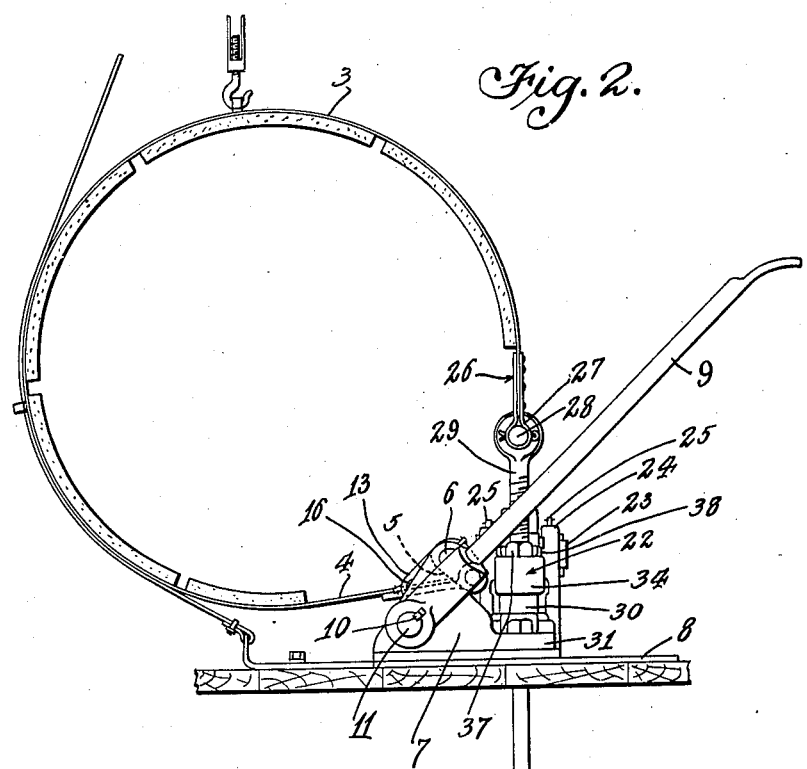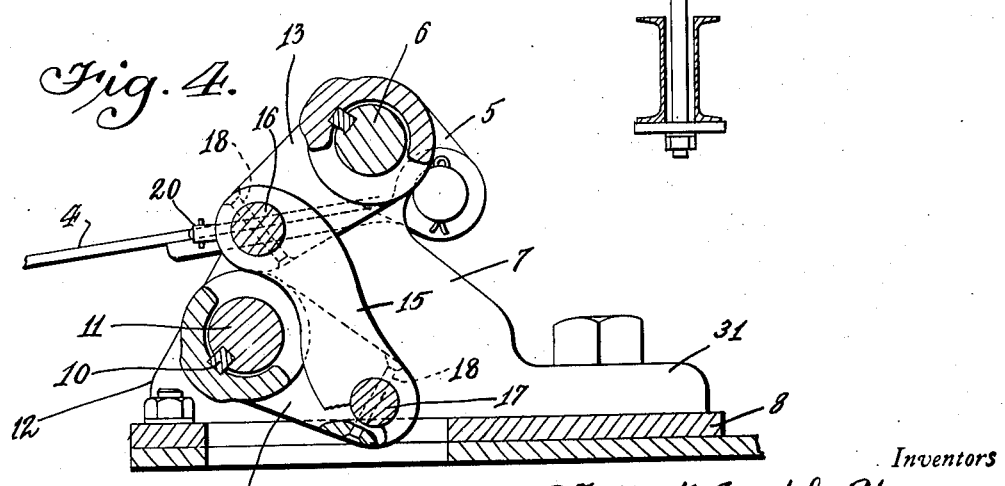

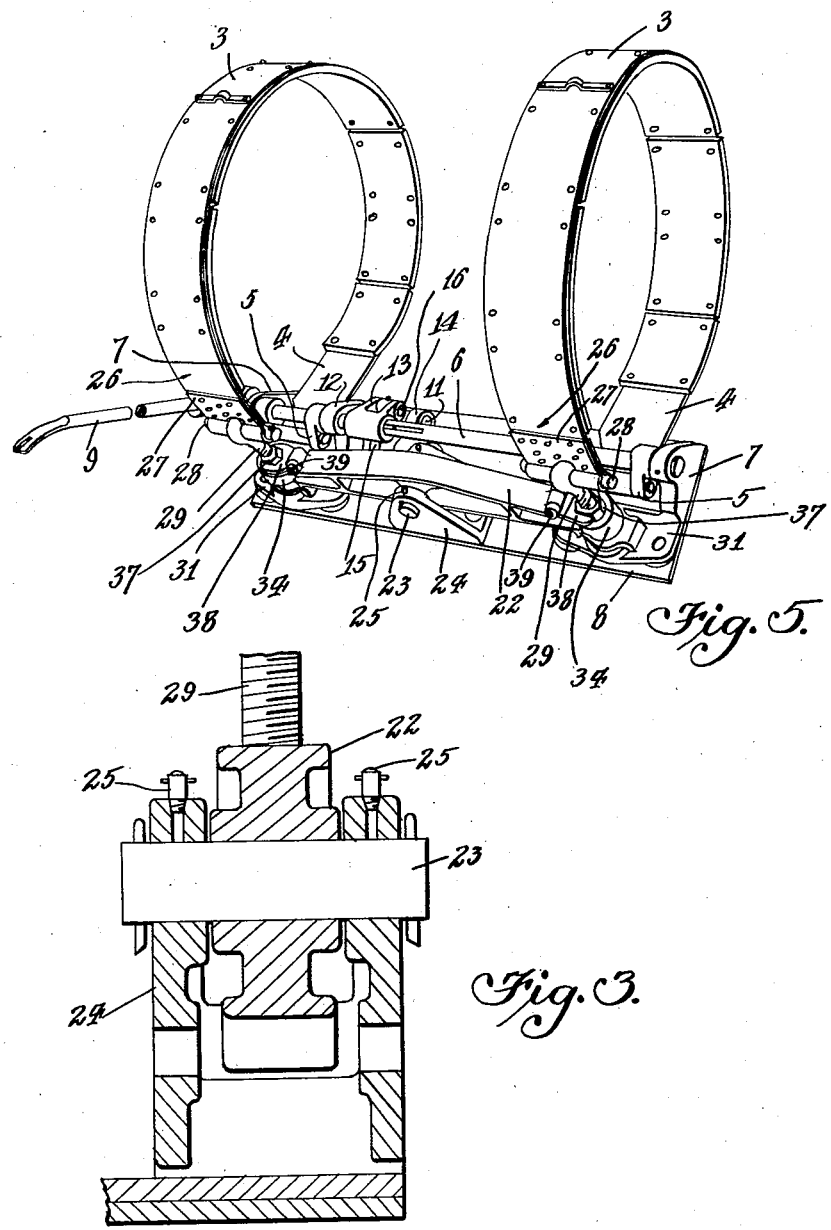

1,956,433

UNITED STATES PATENT OFFICE 1,956,433

BRAKE WITH EQUALIZER

Forrest Joseph Young, Los Angeles, and Spencer William Long, Redondo Beach, Calif., assignors, by mesne assignments, to The National Superior Company, Toledo, Ohio, a corporation of Delaware Application March 2, 1931, Serial No. 519,508

16 Claims. (Cl. 188—77)

This invention relates to brakes and is more particularly related to brakes adapted for use with drawworks as used in the rotary method of drilling wells, and which brakes include means for equalizing the braking pressure applied to the opposed brake rims of the hoisting drum of the drawworks and is so constructed as to apply the brake pressure as the bands are tightened with a gradually increasing compound leverage for holding the load combined with the instant freeing of the entire bands from the brake rims when the pressure on the brake lever is released.

This invention is directed toward an improvement over the band brake assembly disclosed in the copending application of Forrest Joseph Young, Serial No. 388,940, filed August 28, 1929.

The principal object of this invention is to provide a brake for a rotary drawworks which will meet with the constantly increasing loads being placed on such drawworks so that such brakes will hold the excessive loads unfailingly with a minimum of effort on the part of the operator.

Another object of this invention is to provide a brake assembly for a hoisting drum of a rotary drawworks which is so constructed that the power required to be applied to the brake lever by the operator does not increase directly as the bands are tightened but in which the leverage between the brake band actuating lever and the live ends of the band is so compounded that after the brake lever reaches its normal braking position, further depression of the brake actuating lever results in a very slight band travel with constantly increasing brake leverage on the brake bands, and wherein there is provided means for equalizing the brake pressure applied to the brake rims of the hoisting drum, and which equalizing means are so constructed as to give the brake bands initial, final and releasing balance.

Another object of this invention is to provide a band brake actuating mechanism including an equalizing means as above set forth in which the equalizing bar is so connected to the dead ends of the brake bands as to be self-aligning, resulting in a very flexible and automatically adjusted braking effect, and wherein a convenient and easily operated means are provided for adjusting the equalizing bar horizontal at all times regardless of the worn condition of the brake lining.

Another object of this invention is to provide a means of so connecting the dead ends of the brake bands to the equalizer bar that should any part of the brake or equalizer fail that the said connections, or either of them, will be anchored in position permitting either one or both bands to be operated for stopping a load.

Another object of this invention is to provide an improved and simplified form of compound leverage brake applicable for use with an equalizing means and wherein both bands of said brake are actuated from a common leverage system located between said bands and which construction is assembled as a unit permitting its attachment to drawworks either as newly constructed or as already in use with a minimum of effort and alteration.

Other objects and advantages of our invention it is believed will be apparent from the following detailed description of a preferred embodiment thereof as illustrated in the accompanying drawings.

In the drawings:

Figure 1 is a front elevation of a drawworks hoisting drum illustrating a brake band assembly adapted thereto embodying our invention and illustrating certain of the parts in section.

Figure 2 is an end elevation of the structure illustrated in Figure 1.

Figure 3 is a fragmental sectional view taken substantially on the line 3—3 of Figure 1.

Figure 4 is a fragmental sectional view taken substantially on the line 4—4 of Figure 1.

Figure 5 is a detached perspective view of a brake band assembly as embodied in our invention.

In the preferred embodiment of our invention illustrated in the accompanying drawings, 1 indicates the drum of a rotary drawworks which may be of any suitable or desirable construction, as is well understood in the art.

The drum 1 is provided at its opposed ends with brake rims 2 upon which brake bands 3 are mounted. The drum 1 is mounted on a shaft supported in bearings on the posts of the drawworks frame in any suitable or desirable manner, one example of which is shown in the copending application of Forrest Joseph Young, Serial No. 388,940.

The brake band assembly embodying our invention thus includes two spaced brake bands 3, the live ends 4 of which are secured to crank means 5 secured to a brake actuating shaft 6. The brake actuating shaft 6 extends parallel with the longitudinal axis of the brake bands 3 and is supported in bearing brackets 7 secured to a base plate 8.

The brake actuating shaft 6 is actuated from a brake lever 9 through a compound leverage system located between the brake bands 3 and which is so constructed as to provide a gradually increasing compound leverage for holding the load such that as the brake lever 9 is brought forward from the released position, the first effect is to rapidly gather in or tighten the brake bands 3 against the brake rims 2. As the brake lever 9 reaches its normal braking position, further depression of the lever 9 results in a very slight travel of the bands 3 with constantly increasing leverage on the brake bands 3.

The compound leverage is so formed that the entire brake bands 3 are instantly freed from the brake rims 2 when pressure on the brake lever 9 is released. In order to provide for this compound leverage, the lever 9 is secured in any suitable or desirable manner as indicated at 10 to a lever shaft 11. The lever shaft 11 extends from a position outside of one of the brake bands 3 to a point between the brake bands 3 and is supported at points near its respective ends by means of one bearing bracket 7 and a bearing bracket 12 secured to the base plate 8 at a position between the brake bands 3. The brackets 7 and 12 are formed into one integral casting with the bracket portion 31.

Secured to the brake actuating shaft 6 is an actuating shaft arm 13, and secured to the lever shaft 11 is a pair of lever shaft arms 14. The arms 13 and 14 are connected together by means of a curved link 15. The arm 13 is formed as a bifurcated or yoke arm and the link 15 fits between the bifurcation of the arm 13 and the pair of arms 14 and is pivotally secured to these arms by means of pins 16 and 17. The pins 16 and 17 are secured to the arms 13 and 14 by means of lock pins 18. The opposed ends of the links 15 are provided with grease fittings 20 to enable the lubrication of the pivotal connections between the link 15 and the pins 16 and 17.

The two brake bands 3 are adapted to be tightened over the brake rims 2 of the hoisting drum 1 and the brake rims 2 are rigidly connected together through the spooling portion of the hoisting drum 1. The load imposed upon such hoisting drum 1 is exceedingly great, and the braking force applied to the opposed rims must at all times be equal and must be equally released in order to avoid the setting up in the drum 1 of serious torsional strains which, added to the load imposed upon the spooling portion of the drum 1, would endanger the entire structure. This is particularly true in a structure as herein defined where a compound leverage is employed for the purpose of varying the band travel in relation to the travel of the brake lever, as the brake bands are tightened on the brake rims.

In order to provide for the equalizing of the braking force applied to the rims 2 at all times, and to insure the equal releasing as well as initial application of the braking force, we provide an equalizing bar 22 which is pivotally supported at its center on a pivot 23 supported in a bifurcated bracket 24 secured to the base plate 8 of the structure. In order to secure sensitive and positive action of the equalizing bar 22, it is essential that friction be reduced to a minimum, and we therefore provide in our structure grease fittings 25 which extend through the upper portions of the bracket 24 to lubricate the supporting pivot 23 of the equalizer bar 22.

The equalizer bar 22 is at its opposed ends secured to the dead ends 26 of the brake bands 3. The dead ends 26 of the brake bands 3 are so secured to the equalizer bar 22 as to insure at all times that the braking force as applied or released will be balanced between the brake bands 3. The dead ends 26 of the brake bands 3 are provided with clips 27 through which connecting pins 28 are passed. The connecting pins 28 pass through the eyes of eye-bolts 29. The eye-bolts 29 are adjustably threaded at their opposite ends to equalizer sleeves 30. The equalizer sleeves 30 are yieldably mounted in position within base brackets 31 secured to the base plates 8. In order to accomplish this yieldable mounting of the sleeves 30, coil springs 32 are mounted within the sleeves 30 in position to engage at their lower ends the base plate 8, and at their upper ends to be retained and yieldably urge upwardly these sleeves 30. The sleeves 30 are formed with reduced cylindrical portions 33 which pass through eyes 34 formed in the ends of the equalizer bar 22. The shoulder 35 of the sleeves 30 normally engages the under surface 36 of the equalizer bar 22 under the influence of the springs 32. As the sleeves 30 are adjustably secured to the eye bolts 29, they are adjusted upon the eye-bolts 29 so that the equalizer bar 22 at all times remains in a horizontal position under the yieldable influence of the two coil springs 32.

The upper ends of the sleeves 30 are formed hexagonal, as indicated at 37, and the adjustment of the sleeves 30 is locked by means of locking dogs 38 which are pivotally secured as indicated at 39 so as to permit their bifurcated ends to fit over the hexagonal heads 37 of the sleeves 30, thereby locking the sleeves 30 in adjustment.

In order to insure operation of one or both of the brake bands 3 should any part of the brake or equalizer fail, the equalizer sleeves 30 have provided at their lower ends shoulders 40 which provide stops for engaging the inner shoulders 41 of the brackets 31, thus permitting either or both of the bands 3 to be operated for stopping a load should any part of the equalizer assembly fail to function, or should either of the bands 3 break or otherwise become ineffectual.

In operation of the compound brake leverage system herein set forth, for the purpose of tightening the brake bands 3, let it be assumed that the brake lever 9 is moved at a uniform rate for the purpose of tightening the respective brake bands 3 on the brake rims 2. Continued movement of the brake lever 9 results in a decelerating movement of the brake crank arms 5 to tighten the brake band on its brake rim. When the action is reversed with uniform movement of the actuating lever 9, the releasing action of the brake bands is accelerated.

With this construction a greater braking torque in actual foot pounds may be applied to the brake rim with a given amount of movement of the brake lever 9 and the braking torque is applied more uniformly throughout the movement of the brake lever 9 than where the live ends of the brake band 3 are directly connected with an actuating crank arm.

Having fully described our invention, it is to be understood that we do not wish to be limited to the details herein set forth, but our invention is of the full scope of the appended claims.

We claim:

1. In a brake band assembly, the combination of a pair of spaced brake bands, a brake actuating shaft extending parallel to the axis of said brake band means for rotatably supporting said actuating shaft, means for operatively connecting the live ends of said brake bands to said actuating shaft, a brake lever, a brake lever shaft, means for rotatably supporting said brake lever shaft, the brake lever being secured to said brake lever shaft adjacent the outside end of one of said brake bands, a lever shaft arm secured to the lever shaft between said brake bands, an actuating shaft arm secured to the actuating shaft in alignment with the lever shaft arm, a link connecting said arms, said links and arms being so connected and proportioned as to vary the leverage applied from the brake lever to the brake band as the lever is actuated, an equalizer bar extending parallel with the actuating shaft, means for pivotally supporting the equalizer bar at its center, means for adjustably securing the dead ends of said brake bands to said equalizer bar, and means operatively connected at the opposed ends of said equalizer bar to maintain said equalizer bar in initial balance.

2. In a brake band assembly, the combination of a pair of spaced brake bands, a base plate, a brake actuating shaft, means secured to the base plate for rotatably supporting the actuating shaft in position parallel with the axis of said spaced brake bands, a lever shaft rotatably secured to the base plate, an actuating lever secured to the lever shaft, an arm secured to the lever shaft between the brake bands, an arm secured to the actuating shaft in alignment with the first said arm, a link pivotally connected at its ends to said arms, crank means for operatively connecting the live ends of said brake bands to said actuating shaft, an equalizer bar pivotally supported in horizontal position on said base plate, means at the ends of said equalizer bar for yieldably maintaining said equalizer bar in horizontal position, and means for securing the ends of said equalizer bar to the dead ends of said brake bands.

3. In a brake band assembly, the combination of a pair of spaced brake bands, a base plate, a brake actuating shaft, means secured to the base plate for rotatably supporting the actuating shaft in position parallel with the axis of said spaced brake bands, a lever shaft rotatably secured to the base plate, an actuating lever secured to the lever shaft, an arm secured to the lever shaft between the brake bands, an arm secured to the actuating shaft in alignment with the first said arm, a link pivotally connected at its ends to said arms, crank means for operatively connecting the live ends of said brake bands to said actuating shaft, an equalizer bar pivotally supported in horizontal position on said base plate, means at the ends of said equalizer bar for yieldably maintaining said equalizer bar in horizontal position, and sleeves adjustably secured to the dead ends of said brake bands and to the opposed ends of the equalizer bar.

4. In a brake band assembly, the combination of a pair of spaced brake bands, a base plate, a brake actuating shaft, means secured to the base plate for rotatably supporting the actuating shaft in position parallel with the axis of said spaced brake bands, a lever shaft rotatably secured to the base plate, an actuating lever secured to the lever shaft, an arm secured to the lever shaft between the brake bands, an arm secured to the actuating shaft in alignment with the first said arm, a link pivotally connected at its ends to said arms, crank means for operatively connecting the live ends of said brake bands to said actuating shaft, an equalizer bar pivotally supported in horizontal position on said base plate, means at the ends of said equalizer bar for yieldably maintaining said equalizer bar in horizontal position, and sleeves adjustably secured to the dead ends of said brake bands and to the opposed ends of the equalizer bar, and means carried by said equalizer bar for locking said sleeves in adjusted position.

5. In a brake band assembly, the combination of a pair of spaced brake bands, a base plate, a brake actuating shaft, means secured to the base plate for rotatably supporting the actuating shaft in position parallel with the axis of said spaced brake bands, a lever shaft rotatably secured to the base plate, an actuating lever secured to the lever shaft, an arm secured to the lever shaft between the brake bands, an arm secured to the actuating shaft in alignment with the first said arm, a link pivotally connected at its ends to said arms, crank means for operatively connecting the live ends of said brake bands to said actuating shaft, an equalizer bar pivotally supported in horizontal position on said base plate sleeves adjustably secured to the dead ends of the brake bands and passing through the ends of said equalizer bar, said sleeves having shoulders to engage the ends of said equalizer bar, and springs interposed between the base plate and said sleeves for yieldably holding said sleeves in engagement with said equalizer bar.

6. In a brake band assembly, the combination of a pair of spaced brake bands, a base plate, a brake actuating shaft, means secured to the base plate for rotatably supporting the actuating shaft in position parallel with the axis of said spaced brake bands, a lever shaft rotatably secured to the base plate, an actuating lever secured to the lever shaft, an arm secured to the lever shaft between the brake bands, an arm secured to the actuating shaft in alignment with the first said arm, a link pivotally connected at its ends to said arms, crank means for operatively connecting the live ends of said brake bands to said actuating shaft, an equalizer bar pivotally supported in horizontal position on said base plate, sleeves adjustably secured to the dead ends of the brake bands and passing through the ends of said equalizer bar, said sleeves having shoulders to engage the ends of said equalizer bar, springs interposed between the base plate and said sleeves for yieldably holding said sleeves in engagement with said equalizer bar, and brackets secured to the base plate for retaining the lower ends of said sleeves.

7. In a brake band assembly, the combination of a pair of spaced brake bands, a base plate, a brake actuating shaft, means secured to the base plate for rotatably supporting the actuating shaft in position parallel with the axis of said spaced brake bands, means operatively connected with the actuating shaft for actuating the same, crank means for operatively connecting the live ends of said brake bands to said actuating shaft, an equalizer bar pivotally supported in horizontal position on the base plate, means at the ends of said equalizer bar for yieldably maintaining said equalizer bar in horizontal position, and means for securing the ends of said equalizer bar to the dead ends of said brake bands.

8. In a brake band assembly, the combination of a pair of spaced brake bands, a base plate, a brake actuating shaft, means secured to the base plate for rotatably supporting the actuating shaft in position parallel with the axis of said spaced brake bands, means operatively connected with the actuating shaft for actuating the same, crank means for operatively connecting the live ends of said brake bands to said actuating shaft, an equalizer bar pivotally supported in horizontal position on the base plate, means at the ends of said equalizer bar for yieldably maintaining said equalizer bar in horizontal position, and sleeves adjustably secured to the dead ends of said brake bands and to the opposed ends of the equalizer bar.

9. In a brake band assembly, the combination of a pair of spaced brake bands, a base plate, a brake actuating shaft, means secured to the base plate for rotatably supporting the actuating shaft in position parallel with the axis of said spaced brake bands, means operatively connected with the actuating shaft for actuating the same, crank means for operatively connecting the live ends of said brake bands to said actuating shaft, an equalizer bar pivotally supported in horizontal position on the base plate, means at the ends of said equalizer bar for yieldably maintaining said equalizer bar in horizontal position, sleeves adjustably secured to the dead ends of said brake bands and to the opposed ends of the equalizer bar, and means carried by said equalizer bar for locking said sleeves in adjusted position.

10. In a brake band assembly, the combination of a pair of spaced brake bands, a base plate, a brake actuating shaft, means secured to the base plate for rotatably supporting the actuating shaft in position parallel with the axis of said spaced brake bands, means operatively connected with the actuating shaft for actuating the same, crank means for operatively connecting the live ends of said brake bands to said actuating shaft, an equalizer bar pivotally supported in horizontal position on the base plate, sleeves adjustably secured to the dead ends of the brake bands and passing through the ends of said equalizer bar, said sleeves having shoulders to engage the ends of said equalizer bar, and springs interposed between the base plate and said sleeves for yieldably holding said sleeves in engagement with said equalizer bar.

11. In a brake band assembly, the combination of a pair of spaced brake bands, a base plate, a brake actuating shaft, means secured to the base plate for rotatably supporting the actuating shaft in position parallel with the axis of said spaced brake bands, means operatively connected with the actuating shaft for actuating the same, crank means for operatively connecting the live ends of said brake bands to said actuating shaft, an equalizer bar pivotally supported in horizontal position on the base plate, sleeves adjustably secured to the dead ends of the brake bands and passing through the ends of said equalizer bar, said sleeves having shoulders to engage the ends of said equalizer bar, springs interposed between the base plate and said sleeves for yieldably holding said sleeves in engagement with said equalizer bar, and brackets secured to said base plate for retaining the lower ends of said sleeves.

12. In a brake band assembly, the combination of a pair of spaced brake bands, a base plate, a brake actuating shaft, means secured to the base plate for rotatably supporting the actuating shaft in position parallel with the axis of said spaced brake bands, means operatively connected with the actuating shaft for actuating the same, crank means for operatively connecting the live ends of said brake bands to said actuating shaft, an equalizer bar pivotally supported in horizontal position on the base plate, sleeves adjustably secured to the dead ends of the brake bands and passing through the ends of said equalizer bar, said sleeves having shoulders to engage the ends of said equalizer bar, springs interposed between the base plate and said sleeves for yieldably holding said sleeves in engagement with said equalizer bar, brackets secured to said base plate for retaining the lower ends of said sleeves, the sleeves having limit stops adapted to engage said brackets providing safety stops to maintain said brake assembly operative in case of failure of some portion thereof.

13. In a brake band assembly, the combination of a pair of spaced brake bands, a base plate, a brake actuating shaft, means operatively connected with the actuating shaft for actuating same, means for operatively connecting the live ends of said brake bands to said actuating shaft, an equalizer bar pivotally supported in horizontal position on said base plate, sleeves adjustably secured to the dead ends of the brake bands and passing through the ends of said equalizer bar, said sleeves having shoulders to engage the ends of said equalizer bars, spring interposed between the base plate and said sleeves for yieldably holding said sleeves in engagement with said equalizer bar, brackets secured to the base plate for retaining the lower ends of said sleeves, the sleeves having limit stops adapted to engage said brackets providing safety stops to maintain said brake assembly operative in case of failure of some portion thereof.

14. In a brake mechanism, the combination of a pair of spaced brake rims, brake bands mounted on the brake rims, means for actuating the live ends of the brake bands to tighten the same on the brake rims, means for securing the dead ends of the brake bands including an equalizer bar, means for pivotally supporting the equalizer bar, means for operably connecting the dead ends of the brake bands to the equalizer bar, and spring means mounted to act directly upon the last said means for normally yieldably maintaining the equalizer bar in substantially horizontal position.

15. In a brake band assembly, the combination of a pair of spaced brake bands, a brake actuating shaft, means for rotatably supporting the actuating shaft in position parallel with the axis of said spaced brake bands, a lever shaft, means for rotatably supporting the lever shaft, an actuating lever secured to the lever shaft, an arm secured to the lever shaft between the brake bands, an arm secured to the actuating shaft in alignment with the first said arm, a link pivotally connected at its ends to said arms, crank means for operatively connecting the live ends of said brake bands to said actuating shaft, an equalizer bar pivotally supported in substantially horizontal position, means near the ends of said equalizer bar for yieldably maintaining said equalizer bar in horizontal position, and means for securing the dead ends of the brake bands to the equalizer bar.

16. In a brake mechanism, the combination of a pair of spaced brake rims, brake bands mounted on the brake rims, means for actuating the live ends of the brake bands to tighten the same on the brake rims, means for securing the dead ends of the brake bands including an equalizer bar, means for pivotally supporting the equalizer bar, means for operably connecting the dead ends of the brake bands to the equalizer bar, and yieldable means mounted to act directly upon the means for operably connecting the dead ends of the brake bands to the equalizer bar to prevent movement of the equalizer bar from its normal position except as required and incidental to its equalizing function.

FORREST JOSEPH YOUNG.
SPENCER WILLIAM LONG.